United States Patent [19]
Bogan

[11] 3,710,646
[45] Jan. 16, 1973

[54] GEAR HOUSING
[75] Inventor: David B. Bogan, Los Angeles, Calif.
[73] Assignee: David B. Bogan Corporation, Sherman Oaks, Calif.
[22] Filed: Nov. 23, 1970
[21] Appl. No.: 91,720

[52] U.S. Cl. .................................74/609, 105/140
[51] Int. Cl. .............................................B61c 17/08
[58] Field of Search ........74/609, 608, 606; 105/140, 105/59

[56] References Cited

UNITED STATES PATENTS

| | | | |
|---|---|---|---|
| 1,048,328 | 12/1912 | Maize | 74/609 |
| 1,279,711 | 9/1918 | Knight | 74/609 |
| 1,063,676 | 6/1913 | Grady | 74/609 |
| 504,338 | 9/1893 | Forbes et al. | 74/609 |

FOREIGN PATENTS OR APPLICATIONS 478,104   11/1915   France ................................105/140

Primary Examiner—Milton Kaufman
Assistant Examiner—F. D. Shoemaker
Attorney—Roger A. Marrs

[57] ABSTRACT

A gear housing provides a pair of matable sections having corresponding cut-off portions and fastening portions so that the housing may be installed about moving gears and shafts. Attachment areas or connecting structures carried on each section are reinforced with riveted steel retainers and load plates while the basic material may take the form of a fiberglas laminate material.

8 Claims, 9 Drawing Figures

PATENTED JAN 16 1973

DAVID B. BOGAN
INVENTOR.

BY Roger G. Morse

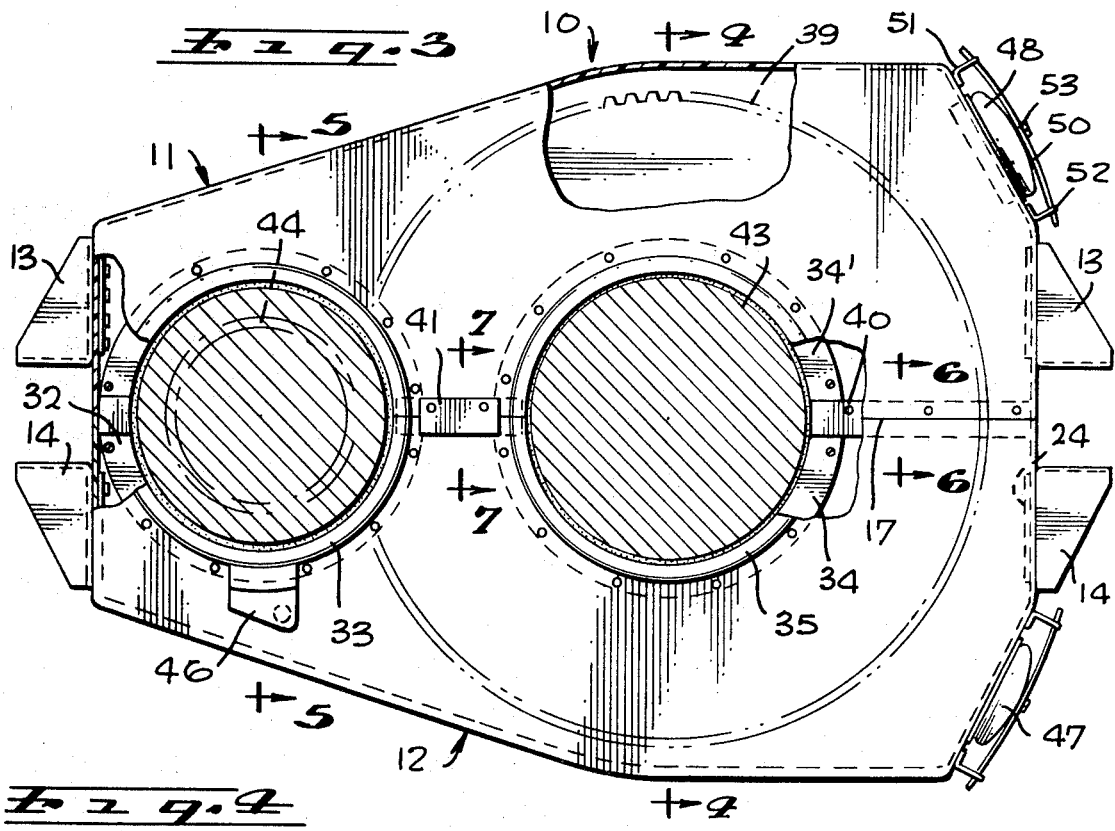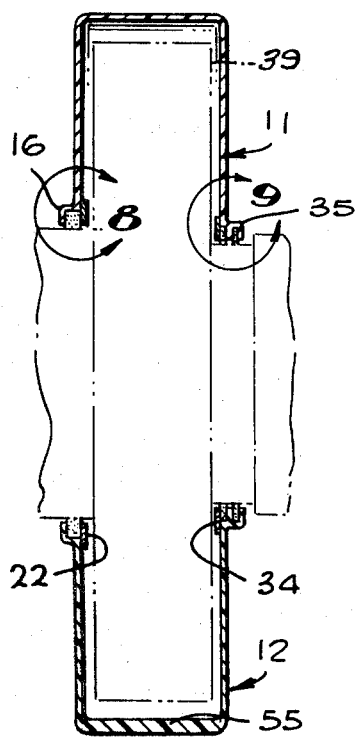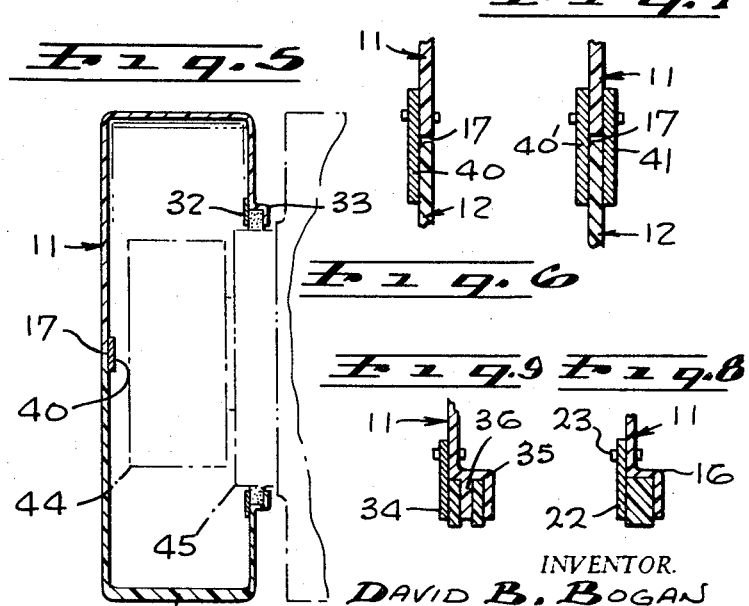

GEAR HOUSING

BACKGROUND OF THE INVENTION

1. Field of the Invention

This invention relates to articles or structures of reinforced fiber and steel composites and, more particularly, to such articles or structures in which the physical and mechanical properties of the composite materials are selectively controlled to meet predetermined design properties. Such properties as strength, stiffness and energy absorption can be selected by the choice of material composition and material geometry.

2. Description of the Prior Art

In many industries, it is desirable to provide an article or panel structure having a high strength-to-weight ratio. In composite materials, two or more materials are combined in an ordered manner to provide a unitary material having properties superior to any of the starting materials. In most cases, composites consist of high strength fibers embedded in a matrix of another substance, although other reinforcement configurations may also be used. Fiber reinforced composites are of particular interest since it has long been known that materials achieve their highest strength in fibrous form.

Composite materials or laminates have been reinforced by various methods so as to accommodate applied stresses which take the form of random oriented fibers, woven mesh, taut fibers in three dimensions, and reinforcement by rigid core members of various configurations. Such reinforcements strengthen the composite laminate to suit the particular application to which the specific combination of reinforcement means relate. However, these same attempts to provide reinforcement, and yet maintain a high strength-to-weight ratio are not adaptable to provide physical properties that are required for other usages of the particular application. In other words, all known reinforced composite panels or structures presently employed are directed towards relatively narrow and specific structural applications and are grossly unsuited for other applications wherein different stresses under varying load conditions are encountered.

Prior art U. S. Letters Patent which suffer from some of the disadvantages mentioned above are set forth in U.S. Pat. Nos. 2,994,327; 2,999,041; and 3,310,300. All of the prior art devices encounter other problems dealing with attachment of sheets or panels to supporting construction such that the panel will ultimately bear loads or transmit the loads into the supporting construction. Even though fiber networks and woven mesh are employed to rigidize the plastic carrier materials, no attempt has been made to utilize a plastic-fiber-steel laminate construction in an edge or central attachment system whereby the panel or sheet may be mounted together or on supporting construction so as to take advantage of the improved load bearing characteristics of the panel or sheet.

SUMMARY OF THE INVENTION

Accordingly, the present invention provides improvements in composite materials consisting of a reinforced fiberglas and steel combination with load carrying elements to create unique physical and mechanical properties. Applied loads are transmitted by the composite through edge attachment plates and retainers. The physical and mechanical properties can be made to satisfy predetermined stress and load requirements through the selection of the fiberglas carrier material, the material of the reinforcing fiber and steel elements and of the reinforcing geometry. The invention provides for a composite material with unique properties designed to meet the preselected physical and mechanical requirements of any specific application. Such properties are obtained through composite engineering, by analysis, matrix selection and reinforcement selection as well as selection of geometry of the composite materials. Furthermore, the invention provides elements for transfer of loads to other structural members through predetermined attachments utilizing the improved properties of the composite. By the selection of materials and of reinforcement geometry, structural efficiency can be obtained to meet the theoretical load distribution as well as environmental operating conditions.

In one form of the invention, a gear housing is provided having matable sections adapted to be fitted together as a unit and fastened to surrounding supporting structure. Each section comprises a reinforced fiberglas sheet having attachment and connection elements secured to selected interfacings of each sheet. Securement may be achieved by any suitable fastening means such as rivets, for example. The elements are composed of steel and rigidize the selected attachment and connection areas so as to be load bearing and load distributing.

Therefore, it is among the primary objects of the present invention to provide a novel reinforced composite article such as a gear housing having a combined selection of fiberglas and steel materials so that the resultant composite has an improved strength-to-weight ratio adapted to accommodate a variety of applied loads.

Another object of the present invention is to provide an improved reinforced composite article which may take the form of a structural configuration such as a panel or sheet of a preselected shape having metallic fittings or brackets arranged at critical locations on the panel or sheet wherein the selected geometry of the panel or sheet and the location of the fittings determine the optimum strength of the composite structure.

Another object of the present invention is to provide a novel composite article, such as a gear housing, consisting of a fiber matrix reinforced with metallic load carrying elements or pieces to create unique physical and mechanical properties and further including attachment means for transmitting loads to and from supporting structure.

Still another object of the present invention is to provide a novel gear case housing having a pair of matable sections and wherein each section is composed of a molded fiberglas panel having certain critical portions of each section reinforced with steel fittings so that a gear case housing of improved characteristics is produced.

Yet another object of the present invention is to provide a novel two-section gear case housing fabricated of fiberglas material and having steel fittings or attachment connections fixedly secured on each of the sections to provide load bearing and load transferring characteristics so that a composite housing is produced having a high strength-to-weight ratio and still providing strength characteristics at least equal to an all steel part.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 3 is an enlarged side elevational view of the gear case housing illustrating the matable sections preparatory to fastening to surrounding structure;

FIG. 4 is a transverse cross-sectional view of the gear case housing shown in FIG. 3 as taken in the direction of arrows 4—4 thereof;

FIG. 5 is a transverse cross-sectional view of the gear case housing as taken in the direction of arrows 5—5 of FIG. 3;

FIG. 6 is an enlarged sectional view of the connection between the opposing edges at the end of the matable sections as taken in the direction of arrows 6—6 of FIG. 3;

FIG. 7 is an enlarged sectional view of the mid-section of the gear case housing illustrating the tongue-in-groove connection between the opposing edges of the matable sections;

FIG. 8 is an enlarged sectional view of the seal and bearing as taken in the direction of the encircling arrows 8—8 of FIG. 4; and FIG. 9 is an enlarged view of the seal and bearing portion of the housing shown in FIG. 4 taken in the direction of arrows 9—9 thereof.

DESCRIPTION OF THE PREFERRED EMBODIMENT

At the present time, railroads are employing in their rolling stock a welded gear case which houses engine gears and drive shafts and which weighs generally about 200 pounds or more since it is fabricated from heavy plate steel. In the event the steel case inadvertently drops to the rails, derailment of the rolling stock may ensue. Also, the weight of the steel gear case requires installation by at least two men. The present invention supplants the currently used welded steel gear case by means of a fiberglas gear case with steel reinforcement at critical locations. The fiberglas gear case is light in weight and durable, can withstand extreme high and low temperatures, is impervious to most chemical compositions such as solvents and cleaners, and requires no change to present methods of cleaning and maintenance. The tensile strength of the fiberglas housing is at least the same as for the steel case.

Figure 1:
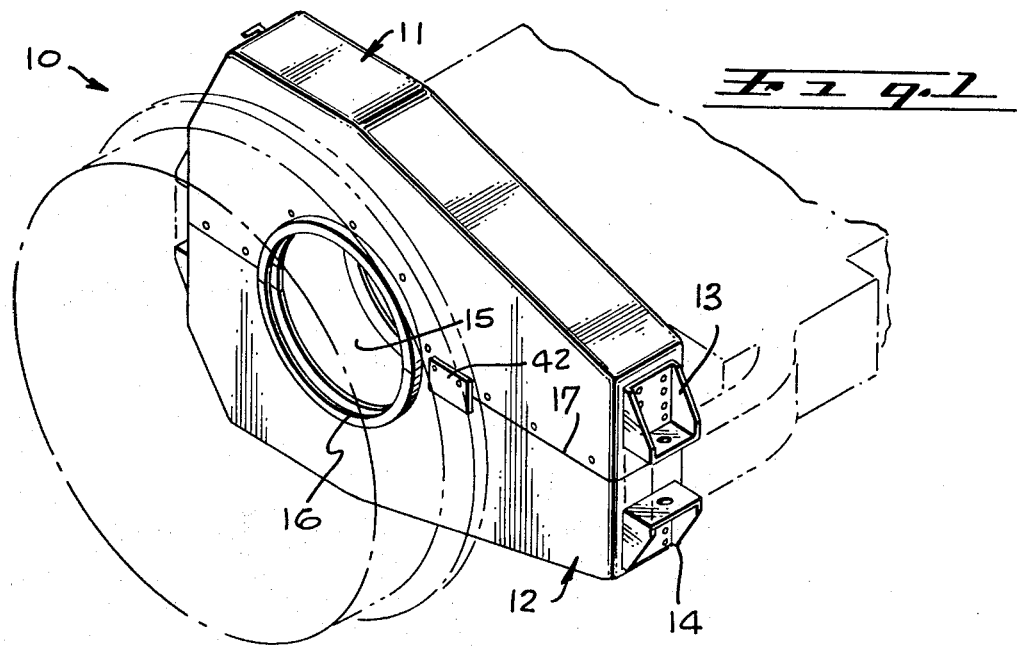
FIG. 1 is a perspective view of the novel gear case housing of the present invention which is fabricated from composite materials.

The novel gear case housing of the present invention is illustrated in FIG. 1 in the general direction of arrow 10 which comprises a pair of matable sections indicated by an upper section 11 detachably connected to a lower section 12. Each section of the housing is substantially identical and their opposing edges are arranged so as to mate in a flush relationship to produce a unitary structure. The housing 10 includes a pair of anchor or connection pieces 13 and 14 that are adapted to detachably couple with a supporting beam or brace suitably disposed between the two pieces. The distance between the opposing surfaces of the pieces 13 and 14 is critically dimensioned so as to accommodate the thickness of the supporting structure therebetween. The opposite ends of the housing 10 are provided with the pair of pieces 13 and 14 and each piece of the pair of carried on the opposite end of each of the case sections 11 and 12 respectively.

The case 10 is hollow so as to encase moving parts such as gears, shafts or the like and towards this end, each of the matable sections 11 and 12 are provided with corresponding cut-outs on one side thereof so as to define a passage 15 communicating the interior of the housing with the exterior thereof through which rotating shafts may pass. Surrounding the passageway 15, there is provided a seal and bearing means as indicated by numeral 16. A parting line, indicated by numeral 17, indicates the removable aspect of the two sections 11 and 12 and indicates the opposing joined edges of the sections. The parting line 17 continues around the entire housing 10.

Figure 2:
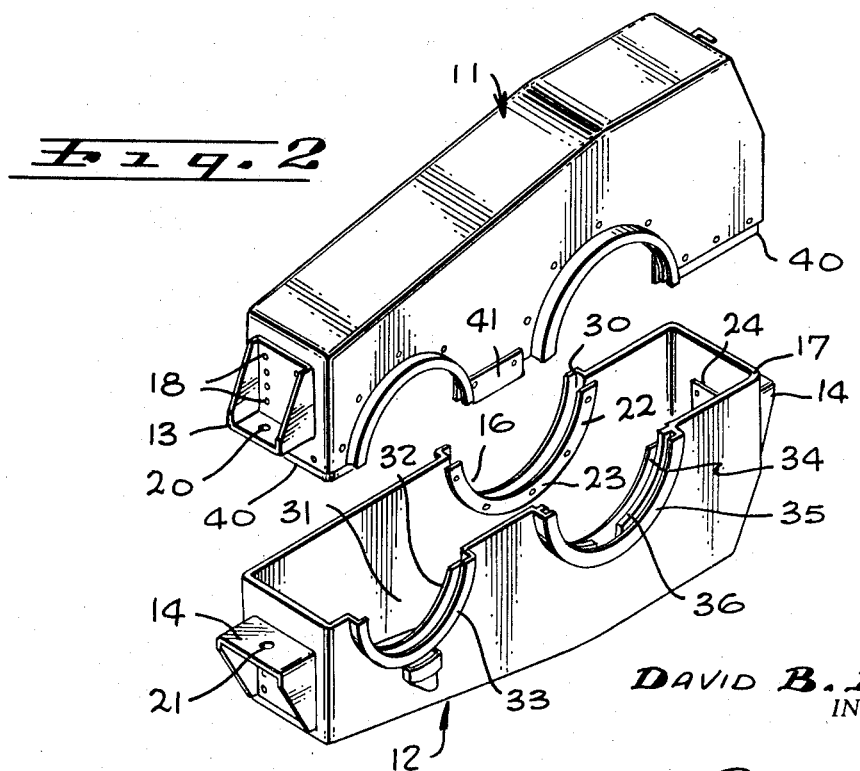
FIG. 2 is an exploded perspective view of the novel gear case housing illustrating the matable sections thereof.

Referring now in detail to FIG. 2, the matable sections 11 and 12 are shown separated preparatory for joining into a unitary structural member. In this view, it can be seen that the attachment or connection pieces 13 and 14 are fastened to the respective ends of the matable sections by means of a plurality of rivets, such as rivet 18. Also, each of the pieces 13 and 14 is provided with a fastening or attachment aperture or hole 20 and 21, respectively, which are located in proper alignment with respect to one another so as to receive fasteners when the sections are more together along the parting line 17. In this same view, it can be seen that the lower section 12 includes load bearing plates or attachment pieces that are riveted to the respective structures or sections 11 and 12. Such a bearing plate is indicated by numeral 22 which is semi-circular in configuration and forms the inside flange for the seal and bearing means 16. The bearing plate 22 is secured to the structure by means of a plurality of rivets, such as rivet 23, for example. Reinforcing plates for load carrying or transferring purposes are employed as backing plates for the attachment pieces 13 and 14 and a typical anchor or backup plate is indicated by numeral 24 in connection with attachment piece 13 carried on the lower section 12. Each attachment plate is secured to the structure by means of a plurality of rivets.

With respect to the material of the case 10 as employed in the upper and lower sections 11 and 12, respectively, the primary material is a fiberglas composition composed of an epoxy-novolack resin reinforced with fiberglas fabric. Preferably, a 24 ounce woven roving is employed and the fabric reinforcement is laminated by curing at temperatures of up to 400°F. The resultant laminate exhibits outstanding mechanical properties including high interlaminar sheer strength and the material is easily bonded to various substrates, if required.

In FIG. 2, it is further illustrated that each of the sections 11 and 12 include matable edges forming the parting line 17 and that these edges are provided with cutouts which, when aligned, provide sealed passageways for accommodating drive shafts or other rotating parts interconnecting the interior of the housing with exterior equipment. As previously described, the seal and bearing means 16, for example, includes an outer flange 30 formed in a half-circle on each other respective sections so that when the sections are mated, a full circle is produced. The outer flange 30 is integrally formed with each section as part of the fiberglas laminate. In the formation of the flange, the flange projects outwardly from the exterior surface of the section and then extends inwardly in a reduced diameter. The inner flange 22 is a semi-circular steel part which is riveted to the fiberglas laminate via the plurality of rivets 23. When the sections 11 and 12 are mated together, the segment or flange element 22 associated with the upper and the lower section mate together and form a circular inner flange. By this means, a space is defined between the inner and outer flanges into which seal material may be disposed, such as felt or the like.

On the other side of the housing 10, each section is provided with additional semi-circular cut-outs which include flanged seal and bearing means similar to that immediately described above. For example, a passageway 31 is defined by an inner steel flange element 32 and an outer flange element 33 composed of fiberglas integrally laminated with the fiberglas of the respective sections. The steel inner flange element 32 is riveted in position. Also, another passageway is provided on the same side of the housing as the side in which passageway 31 is defined which includes a circular seal and bearing means comprising an inner flange element 34 similar to the inner flange elements previously described and an outer fiberglas flange 35. However, an intermediate circular portion 36 is provided so as to define a pair of recesses on opposite sides of the central portion into which sealing or packing material may be placed. Both the central portion 36 and the outer flange 35 are integrally formed with the fiberglas material of the respective section.

It is also to be understood that in order for the upper and lower sections 11 and 12 to be mated and joined, a guide means is provided which extends around the parting line 17. In one form, the guide means includes a steel strip 40 that is riveted along the inside surface of the upper section 11 immediately adjacent to the exposed edge. The strip 40 extends or projects beyond the edge so that the strip will project along the inside surface of the lower section 12 adjacent its respective edge. This relationship is shown more clearly in FIG. 6 wherein it can be seen that the steel strip 40 is riveted to the section 11 and extends along the inside surface of section 12. The guide means for aligning and interconnecting the opposing edges of the respective upper and lower sections further includes a pair of midway guide strips 41 and 42 which are riveted to the upper section 11. FIG. 7 more clearly shows the midway guide strip 41 and its inner guide strip 40' which is in alignment with the major portion of the inner guide strip 40.

Referring now in detail to FIG. 3, it can be seen that the housing 10 may be employed for housing moving parts such as a rotary gear 39 carried on shaft 43. The teeth of gear 39 are in mesh with a reduction gear 44 which is coupled to a shaft 45 as shown in FIG. 5 passing through passageway 31. It can also be seen that the lower section 12 includes a duct return 46 immediately below passageway 31 and adjacent the periphery of the seal and bearing means defined by outer flange 33 and inner flange 32. It can also be seen that each of the respective sections includes a cap 47 associated with the lower section 11 and an upper cap 48 associated with the upper section 12 of the housing. However, in practice, only one access cap need be employed, if preferred. The cap is employed to close a passageway leading into the interior of the housing through which grease or other lubricating materials may be introduced to the housing. The cap includes a yieldable spring lock which may take the form of an elongated leaf spring 50 having its opposite ends engageable with hook portions 51 and 52 when the spring portion 50 is pivoted about its central location and indicated by numeral 53.

Referring now to FIG. 4, it can be seen that a portion of shaft 43 is sealed by means of the seal and bearing means 16 employing inner flange 22 and outer flange 16 as shown in detail by FIG. 8. Another portion of the shaft is sealed by means of inner flange 34 and outer flange 35 in combination with the central portion 36 as shown in FIG. 9. Suitable packing composed of fibrous material such as felt, foam material, or other metallic or non-metallic lubricating material, may be disposed within the recesses defined by the flanges to offer proper sealing and lubrication to the respective shafts. In FIG. 5, the seal and bearing means is defined by numerals 32 and 33 and are substantially identical to flanges 16 and 22, as shown in FIG. 8.

In view of the foregoing, it can be seen that the gear case housing of the present invention provides an improved housing able to withstand steady-state vibration due to the relative low flexural modulus of the fiberglas gear case as compared to a steel case and due to the high tensile strength of the material. The fiberglas gear case sections, upper or lower, are substantially identical and thus are interchangeable. The fiberglas selected or preferred is impervious to vibration, high impacts and stress cracking, Minimum wall thickness for a typical gear case housing is 0.125 inches. However, the lower part of the lower housing is reinforced with additional layers of fiberglas to withstand the impact of rocks and other flying objects. The thickened portion is indicated by numeral 55 in FIGS. 4 and 5. The fiberglas design employs an epoxy resin system impervious to most chemical compositions including hydrocarbons, acids, and alkalais, to mention just a few. The two most severe cleaning methods used by railroads to clean parts are steam cleaning and a strong alkalai bath (12 to 14 PH). The alkalai is heated to a temperature from 180° to 250°F. and the housing is generally submerged in this solution for long time periods. Due to the high PH content and the need for the material to retain its physical properties after removal from this solution, the fiberglas design was selected. Any other method now in use cannot be more severe, and therefore offers no problem through the use of the design.

In actual operation on a railroad car, safety is achieved due to the lightweight design, approximately 50 pounds, assembled. This saving in weight also provides for easy maintenance and installation. All hardware or steel parts which include the semi-circular inner flanges and the guide strips 40 and the outer guide strip segments 41 and 42, are riveted to the fiberglas and there are no welds or bolted joints to break under vibration.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A gear case housing for encasing a plurality of moving parts included in a drive train, the combination comprising:
    a pair of substantially identical sections having corresponding and mating edges for joining in abutting engagement to constitute an enclosure about said moving parts and a selected one of said sections is provided with a double thickness of fiberglass at its bottom end as compared to the thickness of its end and sides;
    guide means cooperatively carried by said opposing section edges for aligning and retaining said section together to define said enclosure which includes a tongue-in-groove construction cooperatively disposed between selected opposite and opposing section edges, said guide and supporting means including strips of steel carried along a selected one of said section edges and projecting beyond said selected edge to engage with said other edge;
    each of said sections preformed with selected cut-out portions along said edges so as to align together to define passageways leading into the interior of said enclosure, said sections being composed of fiberglas material; and
    sealing and bearing means carried in each of said cut-outs to provide a continuous engagement with portions of said moving parts extending through said passageways, said sealing and bearing means comprising an inner flange composed of steel and another flange composed of fiberglas integral with said respective section.

2. The invention as defined in claim 1 including
    steel attachment pieces carried on the opposite ends of said housing in fixed spaced apart relationship so as to receive supporting structure therebetween for mounting said housing.

3. The invention as defined in claim 2 wherein
    said steel flanges, steel guide strip and steel attachment pieces are secured to said fiberglas by rivets.

4. The invention as defined in claim 3 wherein
    said flanges in each of of said sealing and bearing means are in fixed spaced relationship to define a recess for holding a lubricated packing material.

5. The invention as defined in claim 4 wherein
    said sections, pieces, flanges and strips are characterized as being of sufficient composition to withstand a strong alkalai bath of from 12 to 14 PH when said alkalai bath is heated to a temperature of from 180° to 250°F.

6. The invention as defined in claim 1 wherein
    said sealing and bearing means comprises a pair of double recesses defined by three flanges wherein two adjacent flanges are composed of fiberglas and the other flange is composed of steel.

7. The invention as defined in claim 6 wherein
    said sealing and bearing means includes a single recess defined between a fiberglas flange and a steel flange.

8. The invention as defined in claim 7 including lubricated packing carried in said recesses.

* * * * *